United States Patent [19]

Baker

[11] Patent Number: 4,844,516

[45] Date of Patent: Jul. 4, 1989

[54] CONNECTOR FOR COIL TUBING OR THE LIKE

[75] Inventor: Walter Baker, Lewisville, Tex.

[73] Assignee: Otis Engineering Corporation, Dallas, Tex.

[21] Appl. No.: 152,868

[22] Filed: Feb. 5, 1988

[51] Int. Cl.$^4$ ............................................. F16L 17/02
[52] U.S. Cl. ................................. 285/351; 285/175; 285/259; 285/371; 285/382.2; 285/383; 285/906
[58] Field of Search ............ 285/382, 371, 382.2, 285/383, 398, 256, 259, 351, 175, 906

[56] References Cited

U.S. PATENT DOCUMENTS

| | | | |
|---|---|---|---|
| 1,926,270 | 9/1933 | Eastman | 285/259 X |
| 2,497,273 | 2/1950 | Richardson | 285/906 X |
| 3,638,968 | 2/1972 | Barks | 285/328 X |
| 3,689,111 | 9/1972 | Osmun et al. | 285/382 X |
| 4,231,596 | 11/1980 | Ridenour | 285/382.2 |
| 4,330,142 | 5/1982 | Paini | 285/259 |
| 4,729,583 | 3/1988 | Lalikos et al. | 285/256 |

FOREIGN PATENT DOCUMENTS

| | | | |
|---|---|---|---|
| 685353 | 4/1964 | Canada | 285/256 |
| 1141189 | 8/1957 | France | 285/259 |

*Primary Examiner*—Dave W. Arola
*Attorney, Agent, or Firm*—Albert W. Carroll

[57] ABSTRACT

A connector for connecting a tube such as a coil tubing, or the like, to well tools, pipe, or another tube. The connector will withstand high pressures and is capable of transmitting high tensile and torque loads, and can be applied to tubes by crimping through use of conventional swaging devices.

3 Claims, 3 Drawing Sheets

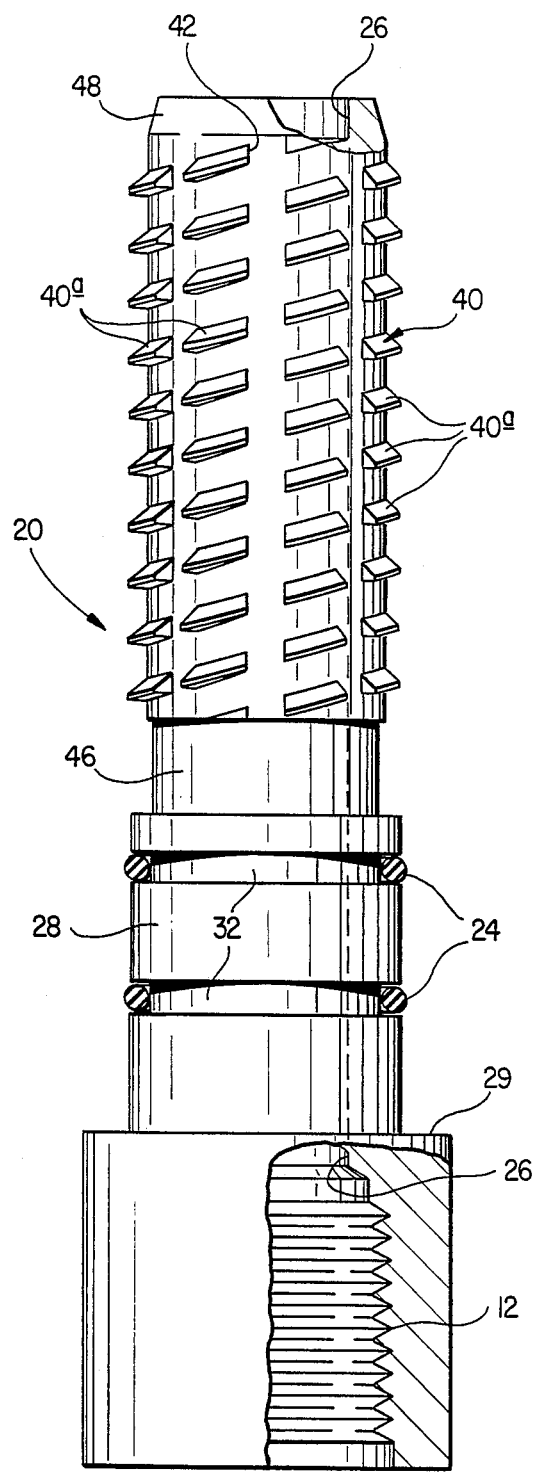
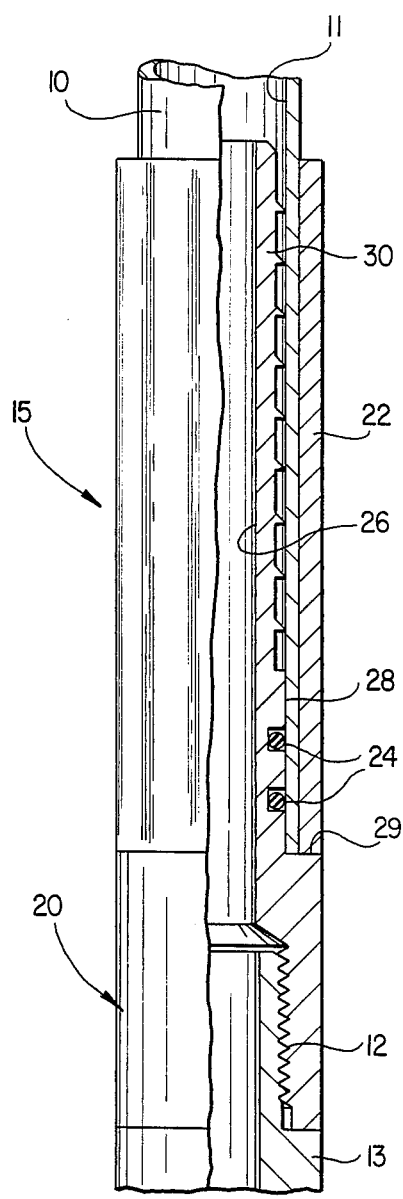
FIG. 2
FIG. 1

CONNECTOR FOR COIL TUBING OR THE LIKE

BACKGROUND OF THE INVENTION

1. Field of the Invention

This invention relates to connecting devices, and more particularly to connector devices for connecting well tools or pipe to relatively thin-wall tubes, such as, for instance, reeled or coiled tubing.

2. Description of the Prior Art

Coil tubing, also known as reeled tubing, has been used in the oil industry for many years. Coiled tubing is often forced into wells through use of a coil tubing injector so that fluids may be circulated down the coil tubing and upward through the well for such purposes as removing sand bridges or other deposits which may plug the well tubing or otherwise hinder the flow of production fluids through the well. It is well known to attach well tools to the distal end of a coil tubing for performing various operations downhole in a well, for instance, using cleaning tools which direct high pressure, high velocity streams of water or other liquids against the wall of the tubing or casing to clean the same, or using well tools which utilize pressurized fluid conducted to them through the coil tubing, or using the push/pull forces applied thereto through the coil tubing to accomplish work as may be required in locking or unlocking, or dislodging tools and/or flow control devices in a well or for actuating well tools requiring such forces for their operation.

It may be desirable in some cases to rotate coil tubing in the well to perform operations such as drilling out sand bridges or the like with bits or similar tools which require rotation. Rotation of coil tubing requires that it be severed and that a connector be attached thereto so that the coil tubing in the well is then connectable either to pipe or reconnected to the coil tubing remaining on the reel.

Of course, whatever tool is used on the lower end of the coil tubing in the well must be securely attached thereto by a suitable connector. While connectors have been used for connecting various tools to coil tubing, or the like, applicant is aware of none which will reliably transfer sufficiently great torque loads in addition to great tensile loads while at the same time withstanding great fluid pressures.

The following patents appear to relate to coil tubing and the attachment of tools and devices thereto, and are hereby incorporated into this application by reference. U.S. Pat. Nos. 3,401,749, 4,091,867, 4,515,220, 4,516,917, 4,518,041, 4,612,984, 4,682,657, 4,685,516.

U.S. Pat. No. 3,401,749 which issued to W. L. Daniel on Sept. 17, 1968 shows, in FIG. 6, a conduit 24 attached to a jetting head 26 by what is obviously a thread.

U.S. Pat. No. 4,091,867 which issued to Frederick E. Shannon, Jr. and Tibor Lakey on May 30, 1978 teaches a system and apparatus for injecting a flexible hose into a well under pressure, the hose 22 being composed of sections joined together by couplings 25. (See FIG. 1 and column 3, lines 16-23.)

U.S. Pat. No. 4,515,220 was issued May 7, 1985 to Phillip S. Sizer, Don C. Cox, and Malcolm N. Council and discloses two different connectors for connecting pipe to the upper end of coil tubing which is to be rotated in a well as for drilling out sand bridges, or similar operations. One of the connectors, shown in FIG. 4, is welded to the coil tubing and provides a pipe thread for receiving the pipe. In FIG. 5 there is illustrated a nonwelded connector having slips for gripping the coil tubing and a thread for receiving the pipe. The end of the coil tubing is notched or slotted and a pin in the connector is engaged in the notch or slot, thus enabling the connector to transmit torque loads. Understandably, this pin/notch arrangement is not likely to transmit very great torque loads.

U.S. Pat. No. 4,516,917 which issued to Carlos R. Canalizo on May 14, 1985 discloses a gas pump attached to the lower end of a coil tubing, this connection being accomplished through use of a hydraulic type connector 34c commonly known as a LENS Fitting. Such fitting is not meant to transfer high torque loads.

U.S. Pat. No. 4,518,041 which issued on May 21, 1985 to Casper W. Zublin shows a jet type cleanout tool attached to coil tubing as in FIG. 2 and as by a thread mentioned at column 5, lines 22-24.

U.S. Pat. No. 4,612,984 which issued to James B. Crawford on Sept. 23, 1986 teaches a connector for connecting wireline tools and the like to the distal end of a coil tubing. This connector provides two load transfer surfaces which are spaced apart longitudinally. The first of these two transfer surfaces is a thread and the other is a plurality of set screws tightened against the outer wall of the coil tubing a spaced distance above the thread.

U.S. Pat. No. 4,682,657 issued to James B. Crawford on July 28, 1987 and is a division of his parent application which matured into U.S. Pat. No. 4,612,984 just discussed. U.S. Pat. No. 4,682,657 whose drawing is identical to that of U.S. Pat. No. 4,612,984 teaches methods for running tools in wells on coiling tubing.

U.S. Pat. No. 4,685,516 which issued to Lonnie J. Smith, et al. on Aug. 11, 1987 teaches apparatus for operating wireline tools in well bores. The tool is connected to the lower end of a coil tubing 28 by a connector 84, the coil tubing 28 having its lower end portion disposed in bore 140 of the connector and is secured therein by a plurality of set screws 139. (See FIG. 5A, and the specification beginning at column 6, line 12.)

Also, Applicant is familiar with a brochure entitled "PYPLOK Pipe Connecting System" published by DEUTSCH Metal Components Division, Gardena, Calif., which shows and discusses a connector for connecting conduits together and may also be useful in connecting coil tubing to coil tubing or to various tools and devices.

There was not found in the prior art a connector for connecting well tools, or the like, or pipe, coil tubing, or the like, which could transmit relatively high tensile and torque loads and withstand relatively high pressures.

SUMMARY OF THE INVENTION

The present invention is directed to a connector for connecting well tools, pipe, a tube, or the like member to the end of a coil tubing or similar tube, having a body with an end portion reduced in diameter providing a stop shoulder, the reduced diameter portion or stem having friction engaging means on its outer surface and sealing means adjacent thereto, the stem being insertable in the end of the coil tubing, until it engages the stop shoulder on the body, and a crimping sleeve crimped about the stem but outside the coil tubing so that the wall of the coil tubing is forced into intimate sealing and gripping engagement with the sealing means and friction engaging surface of the stem to provide an end connection for the coil tubing which is capable of transferring great tensile and torque loads and also withstanding great fluid pressures. The present invention is also directed to a double-ended connector for connecting two sections of coil tubing or other similar tubular members together.

It is therefore one object of this invention to provide an improved connector for connecting tools, pipe, or the like to a tube such as coil tubing.

Another object is to provide such a connector capable of transferring high tensile and torque loads, and able to withstand high fluid pressures.

Another object is to provide a connector of the character described which can be applied through use of common swaging or crimping devices.

Another object is to provide a connector of the character described having friction engaging means and sealing means and a surrounding crimping sleeve which is shrunk in place by crimping or swaging to force the tube wall inwardly into firm sealing and gripping engagement with the seal means and the friction engagement means.

Another object is to provide such a connector in which the friction engaging means is a male buttress thread.

Another object is to provide such a connector in which the male buttress thread has slots extending longitudinally across it to separate it into teeth-like projections or thread fragments.

Another object is to provide a connector such as that just described wherein the friction engaging means is in the form of hard metal particles bonded to the outer surface of the connector body.

A further object is to provide a connector having a double-ended body useful for connecting two tubes together.

Another object is to provide such a connector wherein the double-ended body is made in two pieces which are releasably connectable together, and particularly wherein they are connectable together by a thread.

Other objects and advantages may become apparent from reading the description which follows and from studying the drawing, wherein:

BRIEF DESCRIPTION OF THE DRAWING

FIG. 1 is a fragmentary longitudinal view partly in elevation and partly in section showing a connector constructed in accordance with the present invention connecting a member, such as a well tool, to the lower end of a tube, such as a coil tubing;

FIG. 2 is an enlarged longitudinal view of the body of the connector shown in FIG. 1 with portions thereof broken away;

DESCRIPTION OF THE PREFERRED EMBODIMENTS

Figure 3:
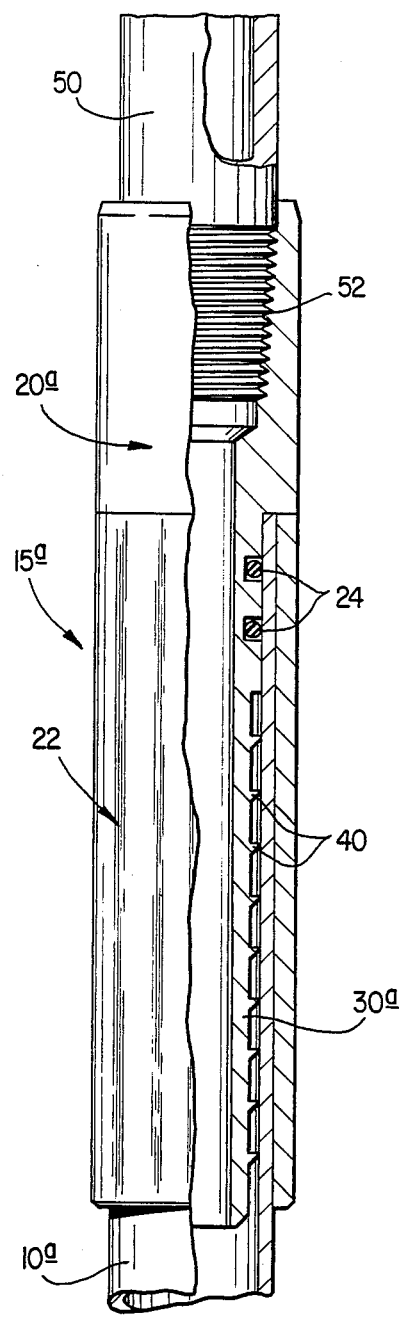
FIG. 3 is a view similar to FIG. 1 but showing a connector of this invention connecting a member, such as a pipe, to the upper end of a tube, such as a coil tubing.

Referring now to FIG. 1, it will be seen that a tube 10 having a bore 11 is connected as by thread 12 to device 13 by means of a connector 15 which embodies the present invention. Tube 10 may, for instance, be a coil tubing or other similar tubular member. The device 13 may be any suitable tool, such as a well tool, or the like. Device 15 is particularly well suited for use with tubes having relatively thin walls such as conduits, coil tubing, or the like.

This invention is an improvement over the connector disclosed in U.S. Pat. No. 4,515,220, supra.

Connector 15 comprises a body 20, a crimping sleeve 22, and at least one resilient seal ring as o-ring 24, two such o-rings being shown.

The body 20, seen in FIG. 2, is tubular, having a bore 26 extending therethrough so that fluids forced through the tube will also pass through bore 26 of the body 20. The upper portion of the body 20, as shown, has its outside diameter reduced as at 28 providing an upwardly facing external shoulder 29, and at the same time providing a stem 30 which is insertable into the end of the tube 10 to such extent that the end surface of the tube substantially engages upwardly facing shoulder 29 of the body 20.

The stem 30 of the body 20 is formed with at least one external annular recess 32 for receiving an o-ring 24, and it may be preferable to provide two such grooves 32 spaced apart and spaced above upwardly facing shoulder 29, as shown.

A short distance above the o-rings 24, the stem 30 of the body has its outer surface provided with teeth-like friction engaging means which may be in any suitable form. The body 20 is shown in FIG. 2 to be formed with a buttress type external thread 40 having a generous lead and which has been slotted by a plurality of milled slots running longitudinally of the body and thus across the thread leaving fragments 40a of each thread 40, as shown. The slant of the thread 40 enables it to more efficiently transfer torque loads, and the fragmentation of the threads by the slots further enhances the torque transmitting capabilities of connector 15.

It may be desirable to reduce the diameter of the stem 30 as at 46 to provide relief and thus facilitate milling of the longitudinal slots 42.

The upper end of the stem 30 is chamfered as at 48 to permit easy insertion into the open end of the tube 10.

The body 20 may be formed of any suitable material. For instance, Type 4130 steel is one good choice of material.

Referring again to FIG. 1, it is seen that the body 20 has been inserted into the lower open end of tube 10 and that upwardly facing shoulder 29 on the body engages the lower end of the tube to limit its movement thereinto. The o-rings 24 are placed in their body recesses 32, and the crimping sleeve 22 is placed about the tube 10 before the body 20 is inserted thereinto. The crimping sleeve is moved into position wherein it engages upwardly facing shoulder 29 of the body also, as shown. Thus, both the tube 10 and the sleeve 22 are abutting the shoulder 29 of the body. Next, the connector is placed in a hose swaging or crimping device of the proper size. Portable hose crimping devices have long been used for crimping hose fittings onto the ends of hoses. Such devices are readily available from such well-known companies as Gates, Aeroquip, or some others which regularly market hoses and fittings therefor.

With the connector 15 in proper place, the crimping device is actuated to squeeze or crimp the crimping sleeve. The crimping device is provided with several spaced apart fingers which are circumferentially spaced about the crimping sleeve 22 and as these fingers are forced radially inwardly the sleeve is crimped and thus shrunk-fit to maintain a tight squeeze about the portion of tube 10 which is covered by the sleeve. In crimping the sleeve 22, the wall of tube 10 is forced inwardly into very intimate contact with the buttress thread fragments 40a such that a good friction bite is developed. In tests on 1¼ inch (3.175 centimeters), outside diameter, coil tubing and a connector such as connector 15, a test pressure of 11,500 pounds per square inch (79,290 kilopascals) was applied for five minutes with no leaks. Then, the same connection was subjected to a torque load of 675 foot-pounds (93.32 kilogram-meters) with no indication of slippage, after which a test pressure of 10,500 pounds per square inch (72,395 kilopascals) was applied with no leaks. Further, the connection was subjected to a tensile load of 24,000 pounds (52,910 kilograms) with no slippage observed. Thus, the connector 15 seen in FIGS. 1 and 2 is well suited for connecting the end of a tube such as coiled tubing or pipe to a tool such as a well tool where high pressures, tensile loads, and torsional loads are involved.

Since the crimping sleeve is distorted considerably when crimped, the material from which it is to be formed might preferably be selected from low carbon leaded alloys, such as Type 1018 steel, for instance. Such steels are not likely to work harden and split when crimped in the manner set forth above.

The body bore 26 should be small enough to provide adequate wall thickness to withstand the crimping forces as well as the tensile, torsional, and pressure loads which may be encountered in actual operations.

Connectors such as connector 15 can be applied to coil tubing, pipe, or the like tubular member, anywhere, as in the field, since application thereof would normally be accomplished through use of a portable hydraulic actuated hose crimping device.

The connector 15 as just described and as illustrated in FIGS. 1-2 provides an efficient means for attaching a well tool to the lower end of a tube such as a coil tubing.

It is sometimes desirable to attach a member to the upper end of a length of coil tubing, or the like. Such connection is shown in FIG. 3.

In FIG. 3, there is illustrated a connector 15a which provides means for attaching member 50 to the upper end of coil tubing 10a. It is applied to the coil tubing in the same manner as described previously. Member 50 may be a joint of pipe threaded as at 52. Pipe 50 is useful in rotating coil tubing in a well to do downhole work therein as taught in U.S. Pat. No. 4,515,220 mentioned above and incorporated herein by reference. Since the only difference between connectors 15 and 15a is the thread (12, 52), the buttress thread 40, the seal rings 24, and the crimping sleeve 22 are installed and function in exactly the same manner.

Connector 15a may be exactly like connector 15 previously described except for the female thread 52 which is a tapered pipe thread wherein the thread 13 in connector 15 is a straight thread.

The body of the connector, such as body 20 of connector 15 or the body 20a of connector 15a, can be threaded as desired, or can be provided with identical threads, in which case adapter subs may be used to connect different tools having different threads.

With the pipe 50 attached to coil tubing 10a, the coil tubing can be raised or lowered, and can be rotated while doing so as taught in U.S. Pat. No. 4,515,220. Connector 15a is ideal for this application since it is capable of transmitting considerable tensile and torque loads and can withstand high pressures as mentioned hereinabove.

Figure 4:
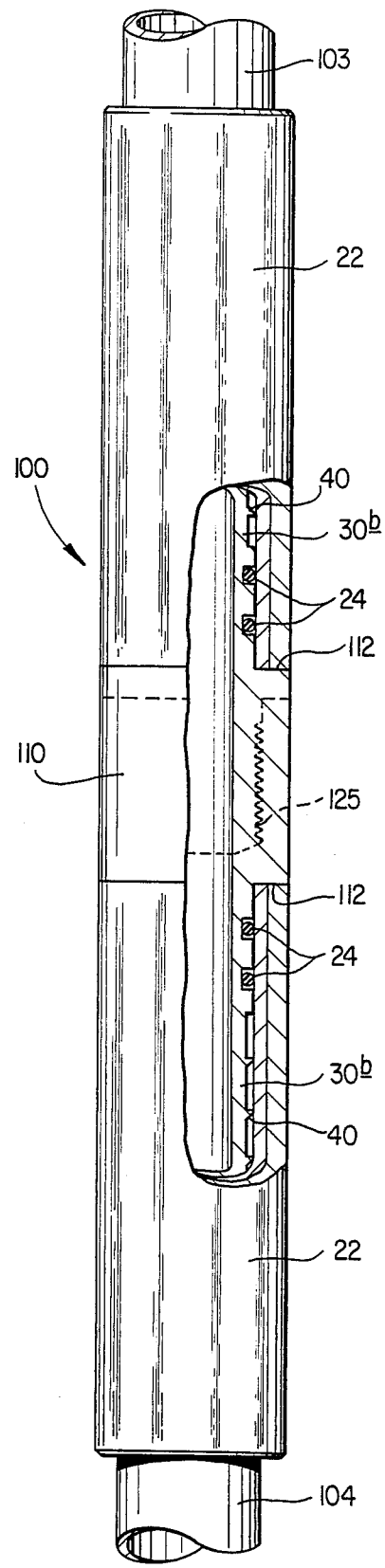
FIG. 4 is a view similar to FIGS. 1 and 3 but showing a doubl-ended connector coupling two tubes, such as sections of coil tubing together, and shown in dotted lines is a thread indicating that the body of the connector can be made in two separate pieces and releasably connected together.

A further embodiment of the present invention is illustrated in FIG. 4. In FIG. 4, a tube coupler or connector is indicated by the reference numeral 100 and connects upper tubing section 103 to lower tubing section 104.

Body 110 of connector 100 has its opposite end portions each reduced in diameter to provide a stop shoulder as at 112 which may be exactly like stop shoulder 29 on body 20, seen in FIGS. 1-2, and provide a stem 30b which may be exactly like stem 30 of connector 15 and stem 30a of connector 15a, including both the buttress threads 40, slots 42, and the o-rings 24. Also, a crimping sleeve 22 is crimped about each of the stem portions 30b as shown.

Connector or coupler 100 is useful in connecting two portions of coil tubing together as for repairs, or the like.

A coil tubing is usually run into a well a number of times before it is discarded or relegated to a less noble purpose. The end of the coil tubing which goes into the well receives the most use and abuse with the result that when it is eventually replaced, one end portion of the tubing may yet be practically new. Thus, some portion of the coil tubing may be salvaged. Coupler 100 is useful in coupling two or more such salvaged portions of coil tubing together. Thus, the salvaged coil tubing may be useful for hanging in a well as a flow conductor (as for lift gas, power fluid, control fluid, or the like) or for use as a pipeline or the like for use on the surface.

For some applications it may be desirable to provide a coupler similar to coupler 100 but which may be taken apart. If so, the body 110 may be made in two pieces, one with a male thread, the other with a female thread with the two of them threaded together as at 125. Alternatively, each of the two body members could be provided each with a female thread as seen in body 20, FIGS. 1-2, or in body 20a, FIG. 3, for instance and then the two of them connected together by a third member (not shown) having a suitable male thread on its opposite ends.

Figure 5:
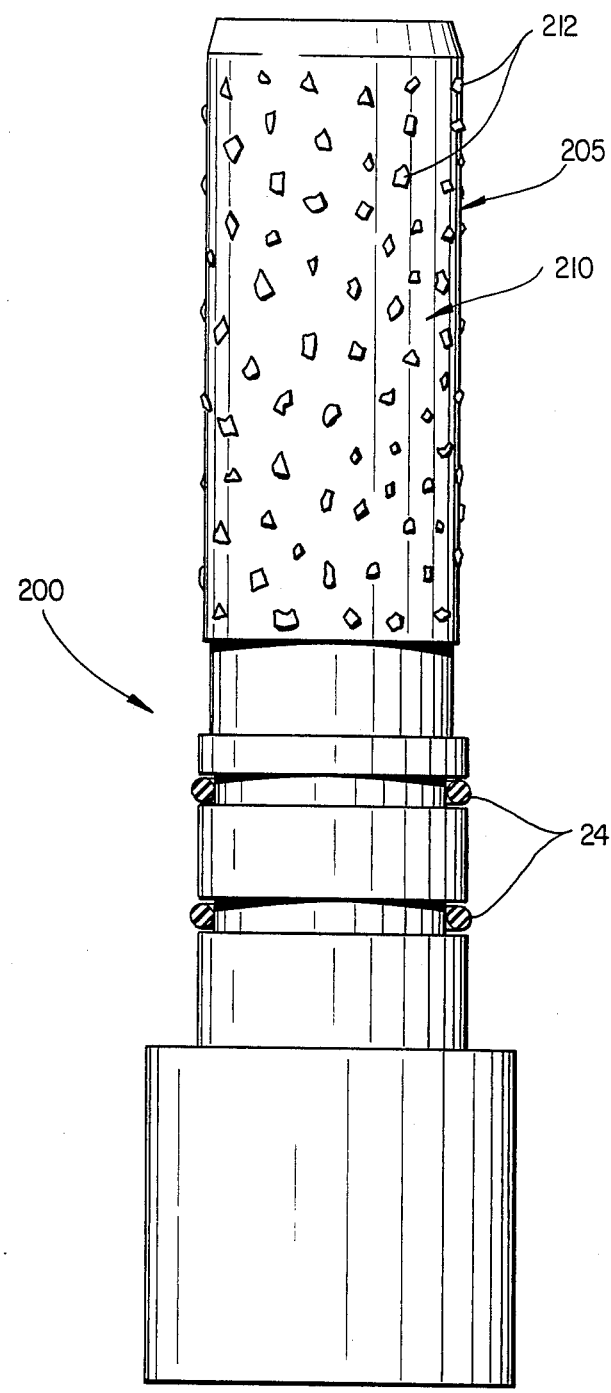
FIG. 5 is a view similar to FIG. 2 but showing a modified body with an alternate form of friction engaging means.

Thus far, each of the connector bodies has been provided by friction engaging means in this form of a buttress thread, which may or may not be slotted as shown in FIG. 2. In FIG. 5, a connector body indicated by the reference numeral 200 is illustrated. Body 200 serves the same purpose as does body 20, 20a, or 20b, but, instead of having buttress thread portions on its stem 205, it is provided with friction engaging means 210 which includes coarse grit such as sintered tungsten carbide particles or similar hard metal fragments 212 which are permanently bonded to the exterior surface of the stem 205 as shown. These particles of hard metal are preferably of relatively uniform thickness but can vary somewhat in breadth or expanse.

When the body 200 is assembled, a connector and a crimping sleeve such as crimping sleeve 22 is crimped therearound, the particles of hard metal 212 will frictionally engage the inner wall of the tube in the same manner that the buttress threads 40 engaged the inner wall of the tube in the previous embodiments and will transfer both tensile and torque loads while the o-rings 24 maintain the pressure integrity of the connector.

Thus, it has been shown that well tools, pipe, or the like, can be connected to an end of a tube, such as reeled (coil) tubing or the like; that such connections are capable of transmitting tensile and torque loads which should far exceed the maximum allowable loads for the tubes with which they are used and will withstand pressures far in excess of the pressures recommended by the tube manufacturer. (In the tests mentioned earlier, the connector was tested to a pressure of 11,500 pounds per square inch (79,290 kilopascals) while the recommended working pressure of the 1.25 inch (3.175 centimeters) coil tubing was limited to 5000 pounds per square inch (34,474 kilopascals); and that the disclosed connectors fulfill all of the objects set forth early in this application.

The foregoing description and drawings of this invention are expanatory and illustrative only, and various changes in sizes, shapes, materials, and arrangements of parts, as well as certain details of construction, may be made within the scope of the appended claims without departing from the true spirit of the invention.

I claim:

1. A connector for connecting a tool or the like to one end of a coil tubing, the coil tubing having a bore therethrough defined by an inner wall, said connector comprising:
    (a) a tubular body having a bore extending longitudinally therethrough, said tubular body having means at one end thereof for attachment to said tool or the like and having its other end reduced in outside diameter to provide both a stem for insertion into the bore of said coil tubing and a stop shoulder for limiting the penetration of said stem thereinto, said stem being formed with friction means thereon in the form of a helical buttress-type thread for engaging and gripping the inner wall of said coil tubing, said stem being formed, with a plurality of longitudinally directed circumferentially spaced slots cutting gaps in said buttress-type thread, and annular groove means formed on said stem between said stop shoulder and said friction means;
    (b) resilient seal means carried in said annular groove means on said stem; and
    (c) a crimping sleeve disposable about said coil tubing and engageable with said stop shoulder of said stem and being crimpable to squeeze the wall of the coil tubing inwardly into gripping and sealing engagement with both said friction means and said resilient seal means.

2. The connector of claim 1, wherein said resilient seal means includes at least one o-ring.

3. A connector for connecting two metal tubes together in axial alignment, each metal tube having a bore therethrough defined by an inner wall, said connector comprising:
    (a) body means having a bore extending longitudinally therethrough, said body having its opposite end portions reduced in diameter to provide an external flange providing a pair of oppositely facing stop shoulders and a pair of oppositely extending stem means, one on either side of said external flange, each said stem means having friction means on its outer surface in the form of a helical buttress-type thread for grippingly engaging the inner wall of one of said metal tubes, and a plurality of longitudinally directed circumferentially spaced slots cutting gaps in said buttress-type thread on each said stem means, each of said stem means being also formed with annular groove means between said stop shoulder and said friction means;
    (b) resilient seal means carried in said annular groove means on each of said stem means; and
    (c) a crimping sleeve for placement about each of said tubes and adjacent a respective one of said stop shoulders, said crimping sleeve being crimpable to squeeze the wall of said metal tube inwardly into gripping and sealing engagement with both said friction means and said sealing means.

* * * * *